(12) United States Patent
Cattoen et al.

(10) Patent No.: US 9,870,551 B2
(45) Date of Patent: Jan. 16, 2018

(54) COLLABORATIVE SPACE PLANNING FOR A DATA CENTER

(71) Applicant: CA, Inc., New York, NY (US)

(72) Inventors: Francois Marie Bruno Cattoen, Newton, MA (US); Janne Mikko Petteri Koponen, Amersham (GB); Dhesikan Ananchaperumal, Shrewsbury, MA (US)

(73) Assignee: CA, INC., New York, NY (US)

( * ) Notice: Subject to any disclaimer, the term of this patent is extended or adjusted under 35 U.S.C. 154(b) by 399 days.

(21) Appl. No.: 14/672,269

(22) Filed: Mar. 30, 2015

(65) Prior Publication Data

US 2016/0292638 A1    Oct. 6, 2016

(51) Int. Cl.
*G06F 15/16* (2006.01)
*G06Q 10/10* (2012.01)
*H04L 12/24* (2006.01)

(52) U.S. Cl.
CPC .......... *G06Q 10/103* (2013.01); *H04L 41/04* (2013.01); *H04L 41/0813* (2013.01); *H04L 41/0893* (2013.01); *H04L 41/5054* (2013.01)

(58) Field of Classification Search
CPC .............. G06Q 10/103; H04L 41/0813; H04L 41/0893; H04L 41/5054; H04L 41/04
See application file for complete search history.

(56) References Cited

U.S. PATENT DOCUMENTS

| | | | | |
|---|---|---|---|---|
| 2008/0155441 | A1* | 6/2008 | Long | G06Q 10/06 715/771 |
| 2014/0337256 | A1* | 11/2014 | Varadi | G05B 13/04 706/12 |
| 2015/0120359 | A1* | 4/2015 | Dongieux | G06Q 10/0633 705/7.15 |
| 2016/0232275 | A1* | 8/2016 | Dixon | G06F 17/5072 |
| 2016/0275210 | A1* | 9/2016 | Cattoen | G06F 17/5004 |

* cited by examiner

*Primary Examiner* — Richard G Keehn
(74) *Attorney, Agent, or Firm* — Sage Patent Group

(57) ABSTRACT

Collaborative space planning for a data center is provided. Methods include receiving, into a collaboration server that provides a collaborative environment for a plurality of data center personnel to participate in data center design operations, data corresponding to a data center modification operation from one of the plurality of data center personnel, sending the data corresponding to the data center modification operation to other ones of the plurality of data center personnel from the collaboration server, receiving, into the collaboration server, supplemental data corresponding to the data center modification from one of the other ones of plurality of data center personnel and sending the supplemental data to the plurality of data center personnel from the collaboration server responsive to receiving the supplemental data.

21 Claims, 6 Drawing Sheets

COLLABORATIVE SPACE PLANNING FOR A DATA CENTER

BACKGROUND

Various embodiments described herein relate to computer program products, methods and devices and, more specifically, to data center computer program products, methods and devices.

A data center may be a large physical space used to house computer systems and associated components such as communications and storage systems. Data centers are proliferating across the world with the increase in use of technology, such as the Internet, virtualization and cloud computing. A data center can provide advantages, such as hosting large numbers of equipment in a small space, which can also provide simplified cabling, a controlled environment (such as air conditioning and fire suppression), redundant or backup power supplies and security.

Data center equipment may include a variety of devices such as servers, network storage devices, computing devices, network routers, network gateways, wireless/wired network interface devices, etc. The data center equipment are generally arranged in racks, which themselves may be arranged in aisles of the data center. The data center configuration may be transient as different equipment may be installed, moved, added, commissioned and/or decommissioned. However, the preplanning for operations corresponding to added, removed, and/or relocated in the data center may rely on inputs and/or approval from multiple different departments that may be responsible for data center infrastructure.

SUMMARY

Some embodiments of the present inventive concepts are directed to a computer program product that comprises a non-transitory computer readable storage medium storing computer readable program code, which, when executed by a processor of an electronic device causes the processor to perform operations including methods for providing collaborative space planning in a data center. Methods may perform operations on a processor including receiving, into a collaboration server that provides a collaborative environment for a plurality of data center personnel to participate in data center design operations, a message that comprises data corresponding to a data center modification operation from one of the plurality of data center personnel. A message comprising the data corresponding to the data center modification operation may be sent to other ones of the plurality of data center personnel from the collaboration server. Methods may include receiving, into the collaboration server, a message that comprises supplemental data corresponding to the data center modification from one of the other ones of plurality of data center personnel and sending a message comprising the supplemental data to the plurality of data center personnel from the collaboration server.

In some embodiments, receiving the message comprising the data corresponding to the data center modification comprises receiving a message comprising an input, via a collaborative graphical user interface corresponding to the data center floor plan, that comprises a graphical portion and a text portion that each correspond to the data center modification operation. Some embodiments provide that the graphical portion comprises a designation graphic that indicates a location on the data center floor plan corresponding to the data center modification operation.

In some embodiments, the data corresponding to the data center modification comprises an identification of equipment and comprises data corresponding to a location in the data center floor plan. Some embodiments provide that the data corresponding to the location in the data center floor plan comprises information about a room, a section, a rack, a server, and/or a power distribution unit that are associated with the equipment and the data center modification operation.

Some embodiments provide that the data center modification operation comprises at least one of installing equipment, moving equipment, adding equipment, commissioning equipment and decommissioning equipment, and that the data center modification operation is associated with a given data center equipment.

In some embodiments, the data corresponding to the data center modification operation comprises identifying information corresponding to ones of and/or groups of the plurality of data center personnel that are designated for the data center planning.

In some embodiments, the data corresponding to the data center modification operation comprises a key word corresponding to the data center modification operation. Operations may also include identifying the key word in the data corresponding to the data center modification operation and generating a work order responsive to identifying the keyword, the work order comprising at least a portion of the data corresponding to the data center modification operation.

Some embodiments include modifying a portion of the data corresponding to the data center modification operation responsive to receiving the message comprising the supplemental data. Some embodiments provide that the data corresponding to the data center modification operation is editable by ones of the plurality of data center personnel that are designated for the data center planning.

Some embodiments include receiving, into the collaboration server, a message comprising an input from ones of the plurality of data center personnel, the input comprising one of an approval of the data center modification, a rejection of the data center modification operation, supplemental data corresponding to the data center modification operation, a question about the data center modification operation, and an acknowledgement of the data center modification operation.

Some embodiments include storing the data corresponding to the data center modification operation and data received responsive thereto in a shared data repository that is accessible to ones of the plurality of data center personnel.

Some embodiments include converting the data corresponding to the data center modification operation and the data received responsive thereto from a first data format that is accessible using a first application to a second data format that is different from the first data format and that is accessible using a second application that is different from the first application. In some embodiments, converting the data is responsive to receiving an input via a collaborative graphical user interface.

Some embodiments include generating, using the collaboration server, a data center modification operation history log comprising the data corresponding to the data center modification operation and the data received responsive thereto. In some embodiments, the data center modification operation history log comprises the data corresponding to the data center modification, the data received responsive thereto, and a time, a date and a data provider identifier corresponding to the ones of the plurality of data center personnel providing the data received responsive thereto.

Some embodiments include generating a collaborative graphical user interface that is sharable among the plurality of data center personnel on corresponding ones of a plurality of data processing devices that are associated with ones of the plurality of data center personnel. In some embodiments, the collaborative graphical user interface comprises an interface to the collaborative environment for the plurality of data center personnel to participate in data center design operations. Some embodiments provide that the collaborative graphical user interface displays note graphics corresponding to paper notes on a graphical representation of a data center floor plan, designation graphics that correspond to locations in the data center floor plan that are referred to in the note graphics and text in the note graphics that comprises a portion of the data corresponding to the data center modification operation. In some embodiments, the collaborative graphical user interface further generates additional graphics and/or text responsive to a user interacting with the note graphics in the collaborative graphical user interface using a user input device.

Some embodiments of the present inventive concept include an electronic device that includes a user interface, a processor and a memory coupled to the processor and comprising computer readable program code that when executed by the processor causes the processor to perform operations described herein, comprising:

Some embodiments of the present inventive concept include a computer program product that includes a non-transitory computer readable storage medium storing computer readable program code that, when executed by a processor of an electronic device, causes the processor to perform operations as described herein It is noted that aspects described with respect to one embodiment may be incorporated in different embodiments although not specifically described relative thereto. That is, all embodiments and/or features of any embodiments can be combined in any way and/or combination. Moreover, other devices, methods, and/or computer program products according to embodiments will be or become apparent to one with skill in the art upon review of the following drawings and detailed description. It is intended that all such additional devices, methods, and/or computer program products be included within this description, be within the scope of the present invention, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s).

DETAILED DESCRIPTION

Figure 1:
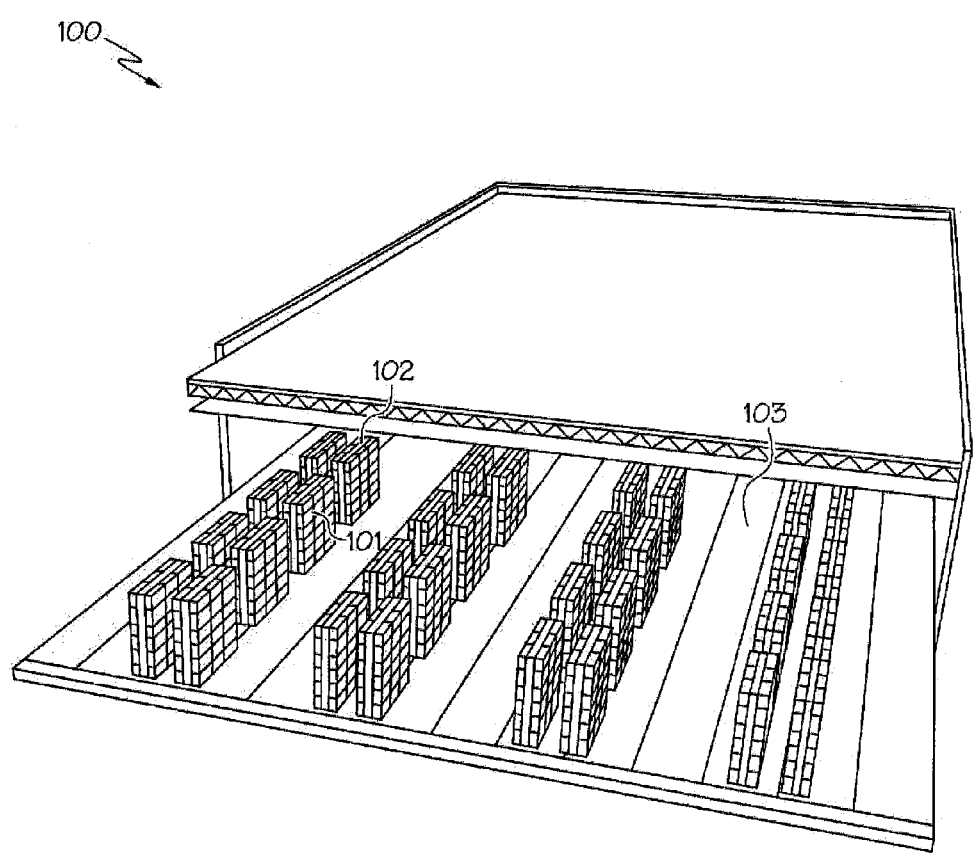
FIG. 1 is a an illustration of a data center according to some embodiments.

Various embodiments will be described more fully hereinafter with reference to the accompanying drawings. Other embodiments may take many different forms and should not be construed as limited to the embodiments set forth herein. Like numbers refer to like elements throughout. Numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As used herein, the term "mobile terminal" or "mobile device" may include a satellite or cellular radiotelephone with or without a multi-line display; a Personal Communications System (PCS) terminal that may combine a cellular radiotelephone with data processing, facsimile and data communications capabilities; a PDA or smart phone that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals or mobile devices may also be referred to as "pervasive computing" devices.

As noted above, data centers are proliferating around the world with increased demand for higher speed data communication. Data centers may include a multitude of data center elements, such as servers, power supplies, routers, firewalls, and the like. As an example, a data center may include thousands of such elements housed in a single physical facility. The elements may generally be arranged in racks, which themselves may be arranged in aisles of the data center. These elements may be physically moved, removed from service upon fault detection, and/or temporarily taken out of service for maintenance. Data center operators may desire to know information, such as location and attributes, about all of the data center elements in the data center to improve performance of the overall data center. Some embodiments of the inventive subject matter stem from a realization that a data center operator may have a desire for up to date information about how the surface area of a data center floor is being used. The data center floor may include racks of electronic equipment that may be labeled with identifiers for maintaining an inventory of these elements. The data center floor may also, however, include unlabeled elements that may not be part of the data center inventory. For example, the data center may include unlabeled elements, such as furniture, storage cabinets, appliances (e.g., portable heaters, fans, refrigerators), and the like. The data center may also include portions of the floor surface area that are currently vacant. Data centers may include a multitude of data center equipment such as telecommunications systems, data storage systems, servers, and switching equipment.

As used herein, the term "equipment" may refer to one or a plurality of equipment in the data center. A data center may include, for example, thousands of equipment housed in a single physical facility. Space planning for a data center may include identifying modification operations corresponding to the equipment. For example, modification operations may include installing, moving, adding, commissioning and/or decommissioning equipment in the data center. For example, equipment may be physically moved, removed from service upon fault detection, and/or temporarily taken out of service for maintenance. A data center may include data center equipment, such as communications equipment including data networking equipment, telecommunications equipment, storage systems, servers, routers, gateways, and/or equipment racks arranged in aisles, rows, and/or stacked in columns. Data center equipment may include supporting equipment, such as power supplies, connectors, wiring, environmental controls, such as Heating, Ventilating, and Air-Conditioning (HVAC), fire suppression equipment, and/or various security devices.

The planning activities for such modification operations may include participation, input, approval and/or communications corresponding to multiple different departments in an organization that is responsible for data center infrastructure. According to some embodiments herein, data center modification operations may be initiated by drafting an action directly in a graphical user interface depicting a data center floor plan. Various embodiments described herein provide methods, devices, and computer program products to provide collaborative space planning for a data center.

Referring now to FIG. 1, a data center 100 is illustrated, according to some embodiments described herein. The data center 100 may be a facility to house computer systems, network, and/or associated equipment. The data center may include data center equipment 101 such as communications equipment including data networking equipment, telecommunications equipment, storage systems, servers, routers, gateways, and/or equipment racks arranged in aisles, rows, and/or stacked in columns. Data center equipment 101 may include supporting equipment 104 such as power supplies, connectors, wiring, environmental controls such as HVAC, fire suppression equipment, and/or various security devices. The data center 100 may be organized to include one or more aisles 103 that include racks 102 that may hold equipment 101. Multiple different data center personnel may be involved in planning the design, maintenance and upgrades for data centers. Examples of data center personnel may include, but is not limited to facility planners, engineers, support service personnel, technicians and/or various levels of management and/or other personnel responsible for one or more aspects of data center operations and/or unpgrades. Once planning activities are completed regarding a new design, a maintenance operation and/or an upgrade or other change, data center technicians may receive a work order that provides a specific aisle, rack, and rack unit within the rack for installation of an equipment.

Figure 2:
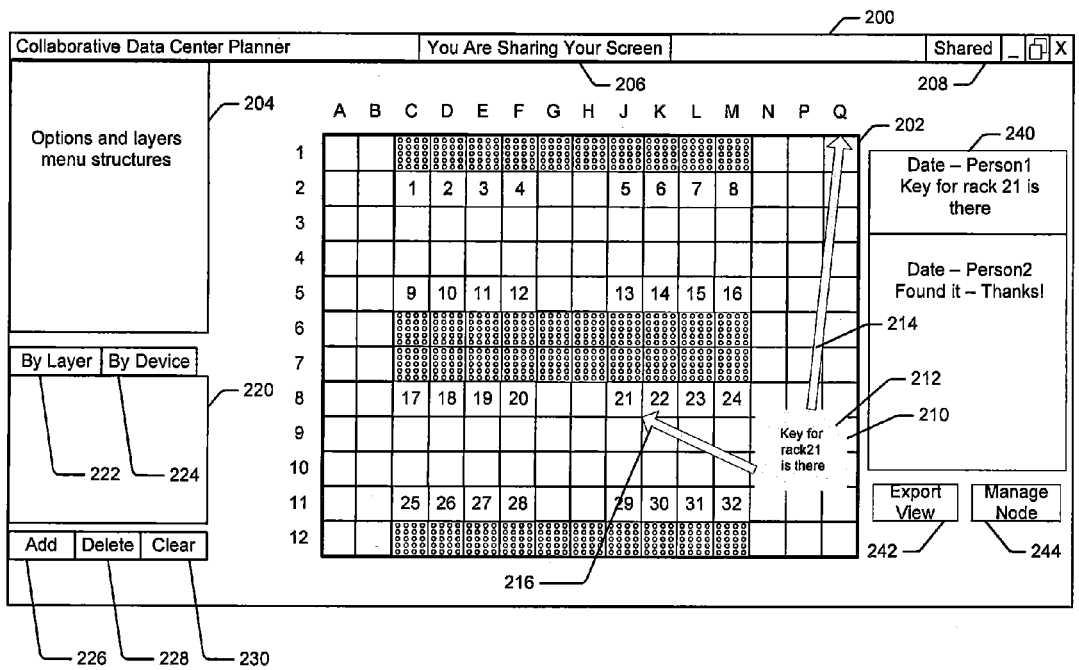
FIG. 2 is a schematic diagram illustrating a screenshot of a collaborative graphical user interface according to some embodiments of the present inventive subject matter.

Reference is now made to FIG. 2, which is a schematic diagram illustrating a screenshot of a collaborative graphical user interface according to some embodiments of the present inventive subject matter. A collaborative graphical user interface ("GUI") 200 may include a graphical and/or text representations of various elements thereof. The GUI 200 may include a data center floor plan that includes top view representations of equipment that is installed and/or planned to be installed therein. Locations in the data center floor plan may be mapped as "x-y" coordinates in which the x-axis may include alphabetic characters and the y-axis may include numerical characters. In this manner, a location in the data center floor plan may be identified by its x-y coordinate pair. Additionally, some embodiments provide that different designations for equipment racks may be individually represented by location and/or rack numbers. For example, as illustrated, rack 21 may be at location J-8.

According to some embodiments, data corresponding to a data center modification operation 210 may be graphically represented on the data center floor plan as a note 212 including text content. Some embodiments provide that the data corresponding to the data center modification operation 210 may also include graphical designators 214, 216, such as arrows or the like. For example, in the illustrated example, the data corresponding to the data center modification 210 is used to provide access information regarding the equipment at rack 21, namely that the location of the key to rack 21 is at a different location, which is identified by graphical designator 214. Since the collaborative GUI 200 is accessible to multiple data center personnel, the information regarding the key location in the provided example is available to the multiple data center personnel.

In some embodiments, a history log 240 corresponding to the data center modification operation may be generated and displayed on the collaborative GUI 200. For example, an entry in the history log 240 include the date of the entry, identification of the data center personnel providing the entry, and/or text corresponding to the data center modification operation. Some embodiments also provide that any responses to the data corresponding to the data center modification operation may be posted in the history log 240 also including the date of the response, identification of the data center personnel providing a response, and/or text content of the response. In this manner data center personnel collaborating to provide the space planning may obtain up-to-date status and history corresponding to proposed data center modification operations.

In some embodiments, the collaborative GUI 200 may include a user input interface corresponding to an export view operation 242. Exporting the view of the collaborative GUI 200 may include exporting the history log 240 and/or the data center floor plan 202 including the data corresponding to the data center modification operation 210 to another file type and/or format for use and/or access using other software applications. For example, some embodiments provide that the exported file includes a document file, such as a PDF and/or word processor file. In some embodiments, the exported file includes a presentation file may be used by one or more presentation software applications. In this manner, the data center modification operation may be discussed, presented, and/or shared with others without the collaborative GUI 200.

In some embodiments, the collaborative GUI 200 may include a user input interface corresponding to a manage node operation 244. Managing the node corresponding to the data center modification operation may include modifying the operation, approving the operation, and/or rejecting the operation, among others. Activating the manage node user input interface 244 may cause one or more menus to appear that include options and/or operations for managing the node corresponding to the data center modification operation.

Some embodiments of the collaborative GUI 200 provide a visual indicator that the file is a shared file 208. Additionally, a visual indicator may be provided indicating that the screen is currently being shared by multiple users 206. Further, the collaborative GUI 200 may provide menu structures 204 corresponding to different options and/or layers that may be accessed, viewed and/or edited using the collaborative GUI 200. Some embodiments provide that data corresponding to one or more data center modification operations may be sorted by layer 222 and/or by device 224, among others, and collectively viewed in a management window 220. The management window 220 may also be used to selectively delete 228 ones of the data center modification operations, to add 226 a new data center modification operation, and/or to clear 231s of the data center modification operations that are listed therein.

Figure 3:
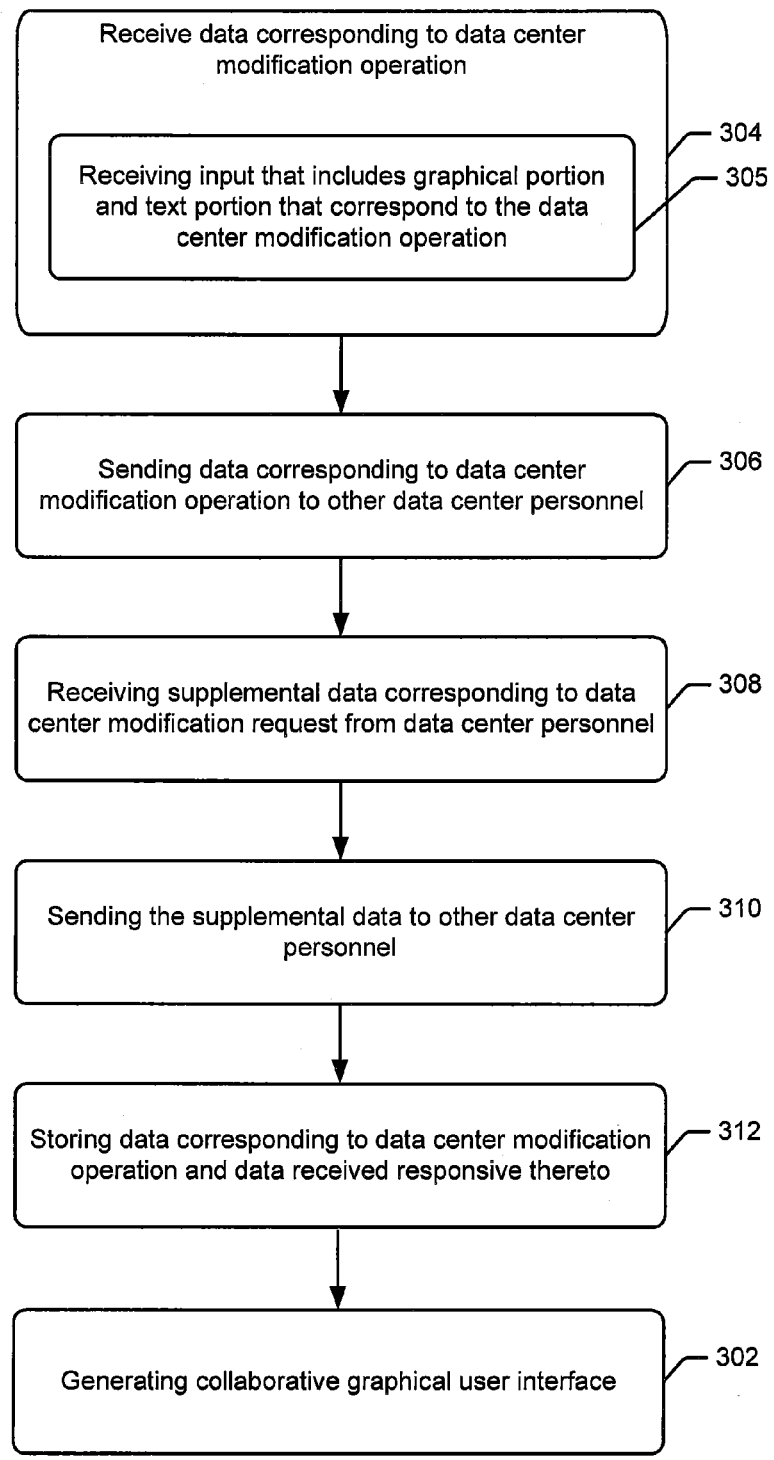
FIG. 3 is a flowchart of operations that may be performed to provide collaborative space planning for a data center according to some embodiments of the present inventive subject matter.

Reference is now made to FIG. 3, which is a flowchart of operations that may be performed to provide collaborative space planning for a data center according to some embodiments of the present inventive subject matter. Operations may include receiving data corresponding to a data center modification operation into a collaboration server (block 304). As used herein, when an operation refers to sending and/or receiving data and/or information to and/or from one or more data center personnel, it will be understood that the data and/or information is sent and/or received via a processing device associated with such personnel. Some embodiments provide that a data center modification operation includes any one or combination of installing equipment, moving equipment, adding equipment, commissioning equipment and decommissioning equipment, among others. In some embodiments, receiving the data corresponding to the data center modification operation includes receiving an input that includes a graphical portion and a text portion that each correspond to the data center modification operation (block 305). Some embodiments provide that the input is received via a collaborative graphical user interface corresponding to the data center floor plan.

In some embodiments, the graphical portion includes a designation graphic that indicates a location on the data center floor plan corresponding to the data center modification operation. For example, the graphical portion may include a graphic corresponding to a note including directions and/or informational content corresponding to the data center modification operation. Some embodiments provide that one or more designation graphics, such as, for example, arrows or other designators, may identify current and/or planned locations of equipment, current and/or planned support devices corresponding to equipment, and/or locations of other non-equipment resources that may be used in performing the data center modification operation. For example, as discussed above regarding FIG. 2, a note and corresponding arrows may indicate the location for keys corresponding to particular equipment.

Some embodiments provide that the data corresponding to the data center modification includes an identification of the equipment and data corresponding to a location in the data center floor plan. For example, identification about the equipment may include type of equipment, such as a server, a switch, a processor device, a data routing device a power supply device, a power distribution device, a climate control device, and/or a climate monitoring device, among others. In some embodiments, the data corresponding to the data center modification operation includes one or more location coordinates corresponding to current and/or planned locations corresponding to the equipment. Some embodiments provide that the data corresponding to the location in the data center floor plan includes information about a room, a section, a rack, a server, and/or a power distribution unit that are associated with the equipment.

In some embodiments, the data corresponding to the data center modification operation includes identifying information corresponding to ones of and/or groups of the data center personnel that are designated for the data center planning. The identifying information may be associated with layers, classes, groups and/or individuals identified for planning the modification operation.

Operations may include sending a message including the data corresponding to the data center modification operation from the collaboration server to other ones of the data center personnel (block 306). In addition to identifying personnel to be involved in the modification operation, the data corresponding to the data center may also include and/or identify levels of input corresponding to the different layers, classes, groups and/or individuals identified for planning the modification operation. For example, different levels of input may be solicited and/or received from different layers, classes, groups and/or individuals of the data center personnel.

Some embodiments further include receiving a message including supplemental data corresponding to the data center modification operation from one of the plurality of data center personnel that are designated for the data center planning (block 308). For example, supplemental data may include additional information, clarification of the modification operation, acknowledgment regarding the data corresponding to the data center modification operation, approval of the data center modification operation, and/or rejection of the data center modification operation, among others. The a message including and/or referencing the supplemental data may be sent provided to other ones of the data center personnel that are designated for the data center planning (block 310). In this manner, space planning for data center may be performed in a collaborative manner by multiple different data center personnel.

Some embodiments provide that the data corresponding to the data center modification operation and data received responsive thereto may be stored in a shared data repository that is accessible to different ones of the data center personnel (block 312). By storing the data in a shared data repository, the data center modification operation data may be updated and available to the data center personnel using their various processing devices for using the collaborative GUI. In some embodiments, when data corresponding to the data center modification operation is received, a new event that corresponds to that operation is generated in the data is pushed out to the appropriate data center personnel. Some embodiments provide that the appropriate data center personnel may be notified via one or more messaging technologies that the new event has been generated. In some embodiments, when supplemental data is received corresponding to the data center modification operation the event is updated and pushed out to the appropriate data center personnel and/or the appropriate data center personnel are notified via the one or more messaging technologies. In this manner the data center modification operation may proceed through the planning stage in a collaborative manner.

Operations include generating a collaborative GUI as illustrated above in reference to FIG. 2 that is sharable among data center personnel (block 302). The collaborative GUI may provide a collaborative interface among multiple different data center personnel who may be involved in data center space planning operations. For example, data personnel from various departments and/or levels of planning, implementation and/or management may collaboratively participate in the space planning operations using the collaborative GUI.

In some embodiments, the collaborative GUI application is centrally located on a server or other type of processing device that is accessible to the data center personnel. For example, the collaborative GUI may be web-based allowing the data center personnel to log in remotely. Some embodiments provide that multiple instances of the collaborative GUI may be provided on different user devices corresponding to the different data center personnel. The user devices may include stationary (fixed location) devices requiring power to be delivered via a direct connection of an electrical conductor and/or mobile devices that include on-board power storage (i.e., battery) and/or wireless data transmission capabilities. Some embodiments provide that the collaborative GUI application may be both centrally located using remote access for some data center personnel via the user devices and locally provided on the user devices for other ones of the data center personnel. Regardless of configuration, inputs received into the collaborative GUI are used to update the data center floor plan for all data center personnel using the collaborative GUI. In this manner, the collaborative GUI is sharable by the data center personnel.

Some embodiments provide that the collaborative GUI generates note graphics corresponding to paper notes on a graphical representation of a data center floor plan, designation graphics that correspond to locations in the data center floor plan that are referred to in the note graphics, and text in the note graphics that includes at least a portion of the data corresponding to the data center modification operation. In some embodiments, the collaborative GUI further generates additional graphics and/or text responsive to a user interacting with the note graphics in the collaborative graphical user interface using a user input device.

Figure 4:
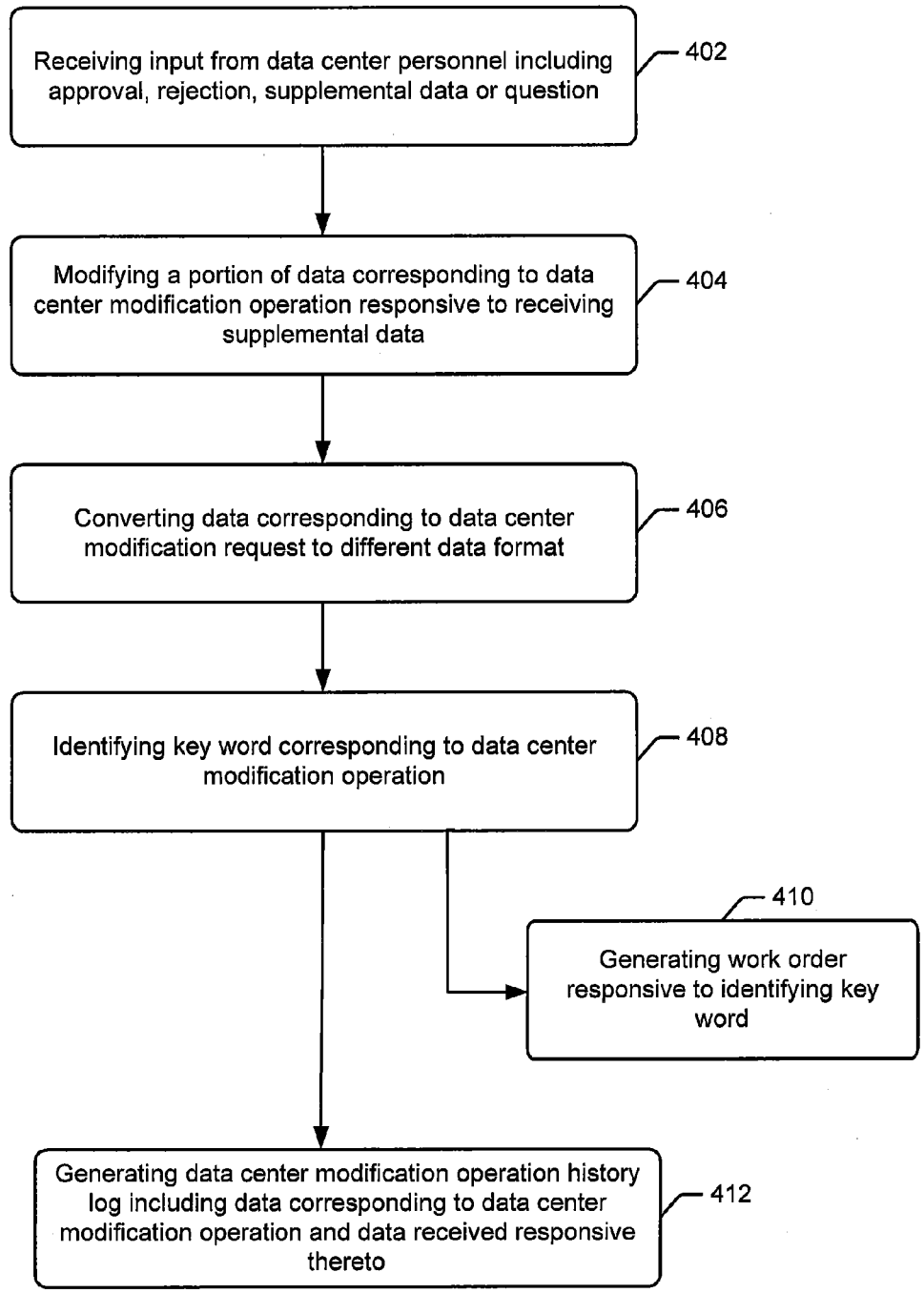
FIG. 4 is a flowchart of operations that may be performed to provide collaborative space planning for a data center according to some embodiments of the present inventive subject matter.

Reference is now made to FIG. 4, which is a flowchart of additional operations that may be performed to provide collaborative space planning for a data center according to some embodiments of the present inventive subject matter. As discussed above, operations may include receiving an input from data center personnel responsive to the data corresponding to the data center modification operation. In some embodiments, the input may include one of an approval of the data center modification, a rejection of the data center modification operation, supplemental data corresponding to the data center modification operation, and a question about the data center modification operation (block 402).

Some embodiments include modifying a portion of the data corresponding to the data center modification operation responsive to receiving the supplemental data (block 404). In some embodiments, the data corresponding to the data center modification operation is editable by ones of the data center personnel. For example, data center personnel that are designated for the data center planning may access, supplement and/or edit the data corresponding to the data center modification operation.

Some embodiments include converting the data corresponding to the data center modification operation and data received responsive thereto to different data format for extra-application access (block 406). Some embodiments provide that the data may be converted for sharing using an application other than the collaborative GUI. For example, a screen shot of the data center floor plan including the data corresponding to the data center modification operation may be exported into a presentation file format and/or an editable and/or non-editable document format, such as, for example, PDF, Microsoft object format to be included in a Power Point file, etc.

In some embodiments, the data corresponding to the data center modification operation includes a key word corresponding to the data center modification operation. In such embodiments, operations may include identifying the key word in the data corresponding to the data center modification operation (block 408). In some embodiments, a work order may be generated responsive to identifying the keyword (block 410). Some embodiments provide that the work order may include at least a portion of the data corresponding to the data center modification operation. Examples of keywords that may trigger the generation of work order include but are not limited to add, install, move, commission, and/or decommission, among others. In some embodiments, the work order may be automatically released once the supplemental data corresponding to the data center modification operation includes approval inputs from one or more data center personnel.

Some embodiments provide that operations may further include generating a data center modification operation history log including the data corresponding to the data center modification operation and data received responsive thereto (block 412). In some embodiments, the history log may include the data corresponding to the data center modification and the data received responsive thereto. For example, each received data item may be considered a log event for which the time, date and a data provider identifier may be provided. In this manner, collaborating data center personnel may review the initial state of a proposed data center modification operation as well as any revisions, updates, comments, approvals, and/or rejections thereof that have occurred.

Figure 5:
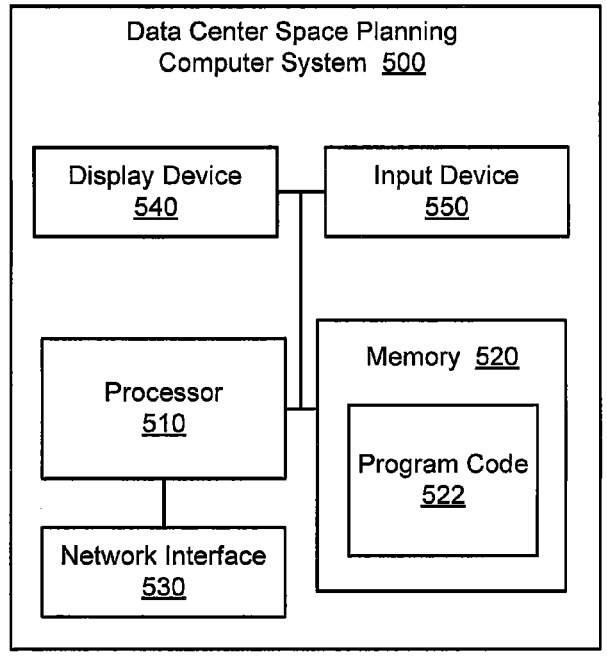
FIGS. 5 and 6 are block diagrams illustrating devices/modules that may be used to provide collaborative space planning for a data center according to some embodiments of the present inventive subject matter.

Reference is now made to FIG. 5, which is a block diagram of an electronic device 500, for use in the data center, that is configured to provide collaborative space planning for the data center according to some embodiments of the present inventive subject matter. The electronic device 500 includes one or more network interfaces 530, processor circuitry ("processor") 510, and memory 520 containing program code 522. The processor 510 may include one or more data processing circuits, such as a general purpose and/or special purpose processor (e.g., microprocessor and/or digital signal processor) that may be collocated or distributed across one or more networks. The processor 510 is configured to execute program code 522 in the memory 520, described below as a computer readable storage medium, to perform some or all of the operations and methods that are described above for one or more of the embodiments. The memory 520 is representative of the one or more memory devices containing the software and data used for facilitating collaborative data center modification operations in accordance with some embodiments of the inventive subject matter. The memory 520 may include, but is not limited to, the following types of devices: cache, ROM, PROM, EPROM, EEPROM, flash, SRAM, and DRAM.

The electronic device 500 may also include a display device 540 (which may display a drag-and-drop user interface) and/or an input device 550, such as a keyboard, touch sensitive display device, mouse, pointer, etc. The network interface 530 can be configured to communicate through one or more networks with any associated available resource server(s) and/or data repositories.

Although FIG. 5 illustrates hardware/software architectures that may be used in data processing systems according to some embodiments described herein, it will be understood that the present invention is not limited to such a configuration but is intended to encompass any configuration capable of carrying out operations described herein.

Figure 6:
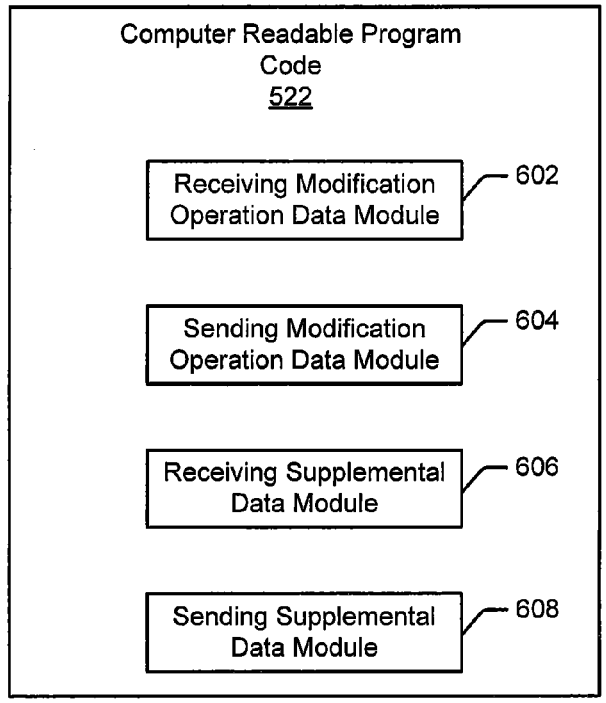

Reference is now made to FIG. 6, which is a block diagram that illustrates the computer readable program code 522 in more detail according to some embodiments of the present inventive subject matter. In particular, the computer readable programming code 522 may include a receiving modification operation data module 602 to receive data corresponding to a data center modification from one of a plurality of data center personnel. The computer readable program code 522 may include a sending modification operation data module 604 to send a message including and/or referencing data corresponding to the data center modification operation to other ones of the plurality of data center personnel. The computer readable program code 522 may include a receiving supplemental data module 606 obtain data corresponding to a data center modification operation from one or more of the data center personnel. The computer readable program code 522 may include a sending supplemental data module 608 to send the supplemental data to the plurality of data center personnel.

Figure 7:
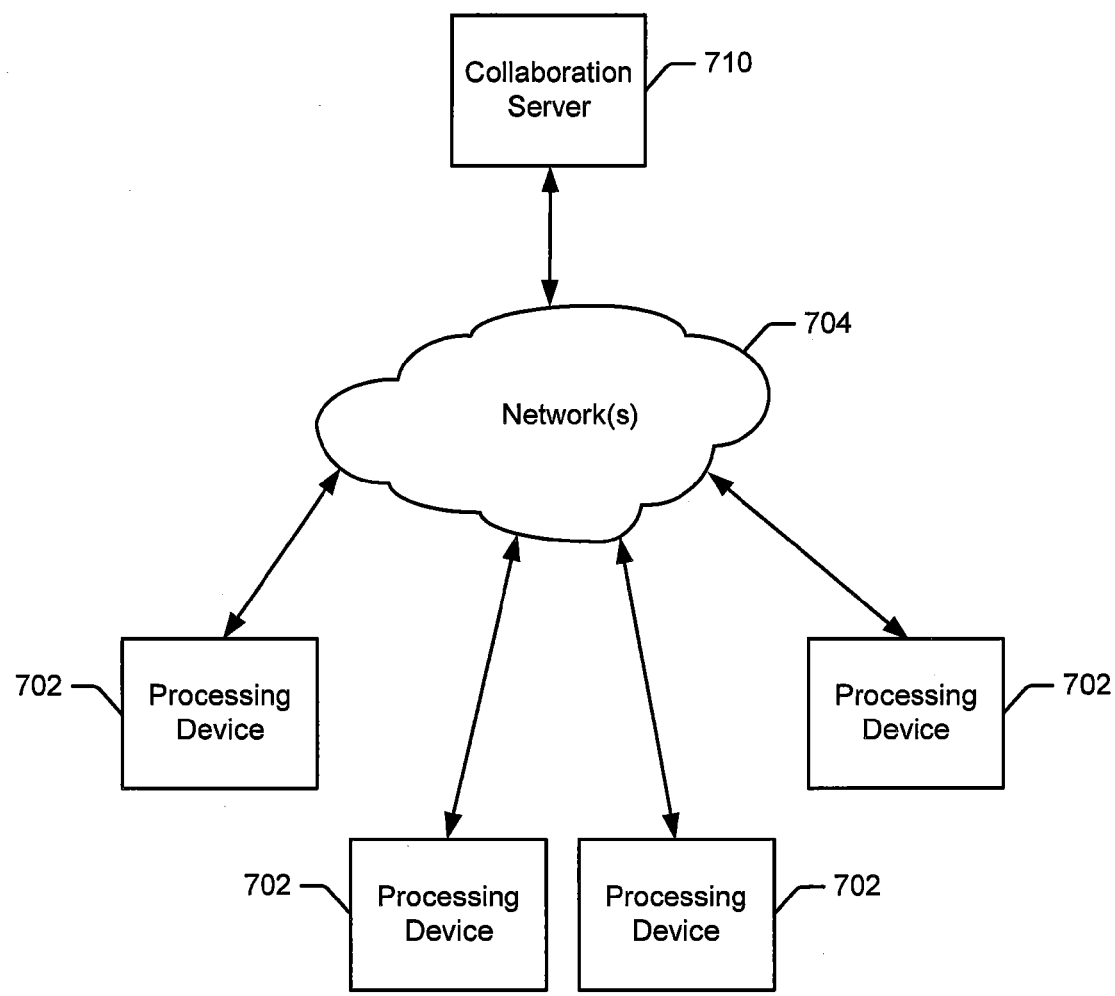
FIG. 7 is a block diagram illustrating a system of devices that may be used to provide collaborative space planning for a data center according to some embodiments of the present inventive subject matter.

Reference is now made to FIG. 7, which is a block diagram illustrating a system of devices that may be used to provide collaborative space planning for a data center according to some embodiments of the present inventive subject matter. Some embodiments provide that systems and/or operations disclosed herein may include a collaboration server 710 that may be communicatively coupled to one or more processing devices 702 via one or more wired and/or wireless communication and/or data networks 704. Ones of the processing devices 702 may be associated with one or more of the plurality of data center personnel that may be involved in the data center planning operations, such as, at an elemental level, an individual data center modification operation.

In some embodiments, the collaboration server 710 may include a dedicated computer that includes a running instance of an application that is capable of accepting requests from one or more clients and providing responses accordingly. Some embodiments provide that the collaboration server 710 may include instances and/or operations corresponding to a file server, a database server, an application server and/or a web server. In some embodiments, the collaboration server 710 includes a stationary or fixed location processing device that receives power via a wired power connection to a facility and/or building power source. Some embodiments provide that the collaboration server 710 transmits and/or receives data via a wired data connection. In some embodiments, the collaboration server 710 may be provided on a mobile processing device that includes an on-board power source and that transmits and/or receives data using a wireless and/or wired data connection.

As disclosed herein, the collaboration server 710 may provide a collaborative environment in which data center planning and design operations may be collaboratively performed. In some embodiments, the collaboration server may generate and run the collaborative GUI as a single instance, providing ones of the processing devices 702 with a remote access thereto via, for example, the network(s) 704. In this manner, the collaboration server 710 may manage and update the data center floor graphic to include graphical and/or textual content corresponding to a data center modification operation and with any supplemental information and/or data received that is associate with the data center modification operation.

Some embodiments provide that the collaboration server 710 is a processing device that is associated with one or more of the plurality of data center personnel. In some embodiments, multiple instances of the collaborative GUI may be operating on multiple different ones of the processing devices 702 and may operate in a client-server mode in which one of the instances of the collaborative GUI is a master and the other instances are slaves. Some embodiments provide that the multiple instances of the collaborative GUI are coordinated with one another in a peer-to-peer relationship.

As realized by the present inventors, computational efficiencies are realized via the systems and operations disclosed herein. For example, computational efficiencies may be realized by reduced resource burden by virtue of the centrally coordinated collaborative environment. For example, a reduction and/or prevention of parallel processes performing similar and/or competing proposed data center modification operations may be achieved via the collaborative environment disclosed herein.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python, etc., conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the terminology used herein is for the purpose of describing particular embodiments only and is not intended to be limiting to other embodiments. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A method comprising:
    performing operations as follows on a processor:
        receiving, into a collaboration server that provides a collaborative environment for a plurality of data center personnel to participate in data center design operations, a message that comprises data corresponding to a data center modification operation from one of the plurality of data center personnel;

responsive to receiving the message, sending a message comprising the data corresponding to the data center modification operation to other ones of the plurality of data center personnel from the collaboration server;

receiving, into the collaboration server, a message that comprises supplemental data corresponding to the data center modification from one of the other ones of plurality of data center personnel;

sending a message comprising the supplemental data to the plurality of data center personnel from the collaboration server; and generating a collaborative graphical user interface that is sharable among the plurality of data center personnel on corresponding ones of a plurality of data processing devices that are associated with ones of the plurality of data center personnel, wherein the collaborative graphical user interface displays:

note graphics corresponding to paper notes on a graphical representation of a data center floor plan and at least one of designation graphics that correspond to locations in the data center floor plan that are referred to in the note graphics and text in the note graphics that comprises a portion of the data corresponding to the data center modification operation.

2. The method according to claim 1, wherein receiving the message comprising the data corresponding to the data center modification comprises receiving a message comprising an input, via a collaborative graphical user interface corresponding to the data center floor plan, that comprises a graphical portion and a text portion that each correspond to the data center modification operation.

3. The method according to claim 2, wherein the graphical portion comprises a designation graphic that indicates a location on the data center floor plan corresponding to the data center modification operation.

4. The method according to claim 2, wherein the data corresponding to the data center modification comprises an identification of equipment and comprises data corresponding to a location in the data center floor plan.

5. The method according to claim 4, wherein the data corresponding to the location in the data center floor plan comprises information about a room, a section, a rack, a server, and/or a power distribution unit that are associated with the equipment and the data center modification operation.

6. The method according to claim 1, wherein the data center modification operation comprises at least one of installing equipment, moving equipment, adding equipment, commissioning equipment and decommissioning equipment, and wherein the data center modification operation is associated with a given data center equipment.

7. The method according to claim 1, wherein the data corresponding to the data center modification operation comprises identifying information corresponding to ones of and/or groups of the plurality of data center personnel that are designated for the data center planning.

8. The method according to claim 1, wherein the data corresponding to the data center modification operation comprises a key word corresponding to the data center modification operation, further operations comprising:

identifying the key word in the data corresponding to the data center modification operation; and generating a work order responsive to identifying the keyword, the work order comprising at least a portion of the data corresponding to the data center modification operation.

9. The method according to claim 1, further comprising modifying a portion of the data corresponding to the data center modification operation responsive to receiving the message comprising the supplemental data, wherein the data corresponding to the data center modification operation is editable by ones of the plurality of data center personnel that are designated for the data center planning.

10. The method according to claim 1, further comprising receiving, into the collaboration server, a message comprising an input from ones of the plurality of data center personnel, the input comprising one of an approval of the data center modification, a rejection of the data center modification operation, supplemental data corresponding to the data center modification operation, a question about the data center modification operation, and an acknowledgement of the data center modification operation.

11. The method according to claim 1, further comprising storing the data corresponding to the data center modification operation and data received responsive thereto in a shared data repository that is accessible to ones of the plurality of data center personnel.

12. The method according to claim 1, further comprising converting the data corresponding to the data center modification operation and the data received responsive thereto from a first data format that is accessible using a first application to a second data format that is different from the first data format and that is accessible using a second application that is different from the first application.

13. The method according to claim 1, further comprising:

generating, using the collaboration server, a data center modification operation history log comprising the data corresponding to the data center modification operation and the data received responsive thereto, wherein the data center modification operation history log comprises the data corresponding to the data center modification, the data received responsive thereto, and a time, a date and a data provider identifier corresponding to the ones of the plurality of data center personnel providing the data received responsive thereto.

14. The method according to claim 1, wherein the collaborative graphical user interface comprises an interface to the collaborative environment for the plurality of data center personnel to participate in data center design operations.

15. The method according to claim 1, wherein the collaborative graphical user interface further generates additional graphics and/or text responsive to a user interacting with the note graphics in the collaborative graphical user interface using a user input device.

16. An electronic device comprising:

a user interface;

a processor; and a memory coupled to the processor and comprising computer readable program code that when executed by the processor causes the processor to perform operations comprising:

receiving, into a collaboration server that provides a collaborative environment for a plurality of data center personnel to participate in data center design operations, a message comprising data corresponding to a data center modification operation from one of the plurality of data center personnel;

responsive to receiving the message, sending a message comprising the data corresponding to the data center modification operation to other ones of the plurality of data center personnel from the collaboration server;

receiving, into the collaboration server, a message comprising supplemental data corresponding to the data center modification from one of the other ones of plurality of data center personnel;

sending a message comprising the supplemental data to the plurality of data center personnel from the collaboration server responsive to receiving the message comprising the supplemental data; and generating a collaborative graphical user interface that is sharable among the plurality of data center personnel on corresponding ones of a plurality of data processing devices that are associated with ones of the plurality of data center personnel, wherein the collaborative graphical user interface displays:

note graphics corresponding to paper notes on a graphical representation of a data center floor plan; and at least one of designation graphics that correspond to locations in the data center floor plan that are referred to in the note graphics and text in the note graphics that comprises a portion of the data corresponding to the data center modification operation.

17. The device according to claim 16,
wherein the collaborative graphical user interface comprises an interface to the collaborative environment for the plurality of data center personnel to participate in data center design operations.

18. The device according to claim 16, wherein the data corresponding to the data center modification operation comprises identifying information corresponding to ones of and/or groups of the plurality of data center personnel that are designated for the data center planning.

19. The device according to claim 16,
wherein the data corresponding to the data center modification operation comprises a key word corresponding to the data center modification operation,
wherein the processor further performs operations comprising:
identifying the key word in the data corresponding to the data center modification operation; and
generating a work order responsive to identifying the keyword, the work order comprising at least a portion of the data corresponding to the data center modification operation.

20. The device according to claim 16, the processor further performs operations comprising:
modifying a portion of the data corresponding to the data center modification operation responsive to receiving the message comprising the supplemental data,
wherein the data corresponding to the data center modification operation is editable by ones of the plurality of data center personnel.

21. A computer program product, comprising:
a non-transitory computer readable storage medium storing computer readable program code that, when executed by a processor of an electronic device, causes the processor to perform operations comprising:
receiving, into a collaboration server that provides a collaborative environment for a plurality of data center personnel to participate in data center design operations, a message comprising data corresponding to a data center modification operation from one of the plurality of data center personnel;
responsive to receiving the message, sending a message comprising the data corresponding to the data center modification operation to other ones of the plurality of data center personnel from the collaboration server;
receiving, into the collaboration server, a message comprising supplemental data corresponding to the data center modification from one of the other ones of plurality of data center personnel; and
sending a message comprising the supplemental data to the plurality of data center personnel from the collaboration server responsive to receiving the supplemental data,
wherein the data corresponding to the data center modification operation comprises a key word corresponding to the data center modification operation,
wherein the processor further performs operations comprising:
identifying the key word in the data corresponding to the data center modification operation; and
generating a work order responsive to identifying the keyword, the work order comprising at least a portion of the data corresponding to the data center modification operation.

* * * * *